United States Patent
Bryskin et al.

(10) Patent No.: US 9,413,486 B2
(45) Date of Patent: Aug. 9, 2016

(54) METHOD FOR COMPLEMENTING DYNAMIC RESOURCE-LEVEL PATH COMPUTATION

(75) Inventors: Igor Bryskin, Great Falls, VA (US); Aihua Guo, Clifton, VA (US); Wes Doonan, Fairfax, VA (US)

(73) Assignee: ADVA Optical Networking SE, Meiningen (DE)

( * ) Notice: Subject to any disclaimer, the term of this patent is extended or adjusted under 35 U.S.C. 154(b) by 182 days.

(21) Appl. No.: 13/305,331

(22) Filed: Nov. 28, 2011

(65) Prior Publication Data

US 2012/0147880 A1 Jun. 14, 2012

Related U.S. Application Data

(60) Provisional application No. 61/421,459, filed on Dec. 9, 2010.

(51) Int. Cl.
*H04J 14/02* (2006.01)
*H04L 12/917* (2013.01)
*H04L 12/911* (2013.01)

(52) U.S. Cl.
CPC ........... *H04J 14/0254* (2013.01); *H04J 14/021* (2013.01); *H04J 14/0212* (2013.01); *H04J 14/0257* (2013.01); *H04L 47/76* (2013.01); *H04L 47/828* (2013.01); *H04J 14/0268* (2013.01); *H04J 14/0293* (2013.01)

(58) Field of Classification Search
CPC .... H04B 10/00; H04J 14/021; H04J 14/0212; H04J 14/0254; H04J 14/0257; H04J 14/0268; H04J 14/0293; H04J 14/0258; H04J 14/026; H04J 14/0227; H04J 14/0269; H04J 14/0271; H04J 14/0264; H04J 14/0267; H04L 47/76; H04L 47/828

USPC .......... 370/351, 357, 431; 398/43, 57, 68, 79, 398/90, 95, 106

See application file for complete search history.

(56) References Cited

U.S. PATENT DOCUMENTS

| | | | |
|---|---|---|---|
| 6,490,621 B1 * | 12/2002 | Forget et al. | 709/224 |
| 6,970,617 B2 * | 11/2005 | Mao | H04J 14/0241 385/24 |
| 7,263,253 B2 * | 8/2007 | Davis et al. | 385/18 |
| 7,689,121 B2 * | 3/2010 | Peloso et al. | 398/58 |
| 7,706,688 B2 * | 4/2010 | Boudreault et al. | 398/59 |
| 8,150,257 B1 * | 4/2012 | Choudhury | H04J 41/0681 398/175 |
| 2002/0030864 A1 | 3/2002 | Chaudhuri et al. | |

(Continued)

OTHER PUBLICATIONS

Jajszczyk, "The ASON Approach to the Control Plane for Optical Networks", 2004, IEEE, 6th International Conference on Transparent Optical Networks, pp. 87-90.*

(Continued)

*Primary Examiner* — Gary Mui
*Assistant Examiner* — Michael Phillips
(74) *Attorney, Agent, or Firm* — Jenkins, Wilson, Taylor & Hunt, P.A.

(57) ABSTRACT

A method for complementing dynamic resource-level path computation with a resource grouping constraint in a network comprising the steps of deriving a resource group function, RGF, from relationships amongst network resources within at least one network element forming at least one network resource group, NRG, and performing the resource-level path computation accounting for the derived resource group function, RGF.

17 Claims, 3 Drawing Sheets

(56) References Cited

U.S. PATENT DOCUMENTS

| | | | | |
|---|---|---|---|---|
| 2002/0176134 A1* | 11/2002 | Vohra | ................... | G02B 6/2932 398/82 |
| 2003/0061263 A1 | 3/2003 | Riddle | | |
| 2003/0095500 A1* | 5/2003 | Cao | ................ | 370/216 |
| 2004/0032831 A1 | 2/2004 | Matthews | | |
| 2005/0198247 A1* | 9/2005 | Perry et al. | ................... | 709/223 |
| 2007/0025729 A1* | 2/2007 | Barnard | ........................... | 398/5 |
| 2008/0013950 A1* | 1/2008 | Boudreault | ......... | H04J 14/0212 398/59 |
| 2008/0260383 A1* | 10/2008 | Zhong et al. | .................... | 398/50 |
| 2009/0030664 A1* | 1/2009 | Bridges et al. | .................... | 703/5 |
| 2009/0041463 A1* | 2/2009 | Zhong | ................ | G02B 6/2931 398/85 |
| 2009/0103442 A1* | 4/2009 | Douville | ....................... | 370/248 |
| 2009/0109860 A1* | 4/2009 | Cinato et al. | ................... | 370/242 |
| 2009/0180779 A1* | 7/2009 | Boduch et al. | .................. | 398/83 |
| 2010/0021166 A1* | 1/2010 | Way | ............................... | 398/79 |
| 2010/0124391 A1* | 5/2010 | Feuer et al. | ..................... | 385/24 |
| 2010/0142943 A1* | 6/2010 | Frankel et al. | .................. | 398/25 |
| 2010/0150558 A1* | 6/2010 | Wisseman | .......... | H04J 14/0212 398/79 |
| 2010/0208756 A1* | 8/2010 | Noh | ............................... | 372/20 |
| 2010/0272441 A1* | 10/2010 | Boduch | .............. | H04J 14/0206 398/83 |
| 2011/0052201 A1* | 3/2011 | Ji | ........................ | H04J 14/0204 398/83 |
| 2011/0142439 A1* | 6/2011 | Chen | ................... | H04B 10/0775 398/16 |
| 2011/0262143 A1* | 10/2011 | Ji | ......................... | H04J 14/0204 398/83 |
| 2011/0286746 A1* | 11/2011 | Ji | ......................... | H04J 14/0204 398/83 |
| 2012/0163825 A1* | 6/2012 | Wu | ..................... | G02B 6/29313 398/85 |
| 2012/0185229 A1* | 7/2012 | Perrett | ............................ | 703/13 |

OTHER PUBLICATIONS

Gringeri et al., "Flexible Architectures for Optical Transport Nodes and Networks", Jul. 2010, IEEE, Communications Magazine vol. 48, Issue 7, pp. 40-50.*

Lee et al., "Framework for GMPLS and PCE Control ov Wavelength Switched Optical Netwoks (WSON) draft-ietf-ccamp-rwa-wson-framework-02.txt," Networking Working Group, Internet Draft (Mar. 4, 2009).

Extended European Search Report for European Patent Application No. 11192241.5 (Dec. 20, 2013).

Roth et al., "SUSE Linux Enterprise High Availability Extension High Availability Guide, Chapter 4. Configuration and Administration Basics,"(Jun. 25, 2012), retrieved Jan. 28, 2014 http://doc.opensuse.org/products/draft/SLE-HA/SLE-ha-guide_sd_draft/cha.ha.configuration.basics.html.

* cited by examiner

METHOD FOR COMPLEMENTING DYNAMIC RESOURCE-LEVEL PATH COMPUTATION

PRIORITY CLAIM

This application claims the benefit of U.S. Provisional Patent Application Ser. No. 61/421,459, filed Dec. 9, 2010; the disclosure of which is incorporated herein by reference in its entirety.

TECHNICAL BACKGROUND

The invention relates to a method for complementing dynamic resource-level path computation with a resource grouping constraint in a network and in particular in a wavelength division multiplexing (WDM) network.

A network can be modelled as a collection of switches or other network elements which are interconnected to each other via links. Each link can further be populated with a pool of resources. In the context of wavelength division layer networks these resources can refer to fixed or tunable wavelength channels available for a WDM layer connection.

In general, there exist relationships between the resources of a network. For example, attributes of a resource or operations on a resource within the network may have an effect on other resources of the network. These relationships between the resources may be induced by hardware or device limitations, operational dependencies or non-orthogonalities. There are also situations where an entire set of resources has to be treated in a manner distinct from other resources due to the nature of specific algorithm implementations which process the resource information base of the network in a particular manner. Relationships between resources in a network can also be induced directly through application requirements of specific operational policies defined for the respective network.

If relationships between resources are not known to an application which is provided to perform a computation on the resource information base this application may be unable to produce correct results, and/or be forced to execute heuristic-based procedures which achieve only sub-optimal results. Such heuristic-based procedures can often devolve into exhaustive searches which are unacceptable, for example in an on-line or time-critical environment.

Resource information models currently used for traffic engineering purposes treat provisionable resources of a network as entirely individual and unrelated entities. For example, the WSON architecture as defined within IETF identifies the notion of asymmetries within a switching element but does not make any provisions for the notion that the resources affected by these asymmetries may be inter-related in some non-trivial manner. This lack of relationship information data renders current applications unable to generate computationally complete results under certain conditions.

At present common information models treat resources as entirely individual entities, hence, any relationships amongst them are not expressed through the information model. Applications making use of this information model of the network are therefore currently not able to compute complete solutions in all cases, and thus are forced to utilize more heuristic approaches.

Consequently, there is a need to provide a method for complementing dynamic resource-level path computation taking into account relationships between resources.

SUMMARY OF THE INVENTION

The invention provides a method for complementing dynamic resource-level path computation with a resource grouping constraint in a network comprising the steps of:
   deriving a resource group function from relationships amongst network resources within at least one network element forming at least one network resource group and
   performing the resource-level path computation accounting for the derived resource group function.

In a possible embodiment of the method according to the present invention the network resources of the network resource group are controlled depending on predetermined traffic engineering goals.

In a possible embodiment of the method according to the present invention the network resource group is automatically generated by means of a resource auto-discovery mechanism.

In an alternative embodiment of the method according to the present invention the network resource group is manually configured by an operator of said network.

In a possible embodiment of the method according to the present invention the network resource group comprises network resources which are accessible on a network element of said network from the same or separate links.

In a possible embodiment of the method according to the present invention the network resources of the network resource group share a common set of attributes, functionalities and/or inter-relationships.

In a possible embodiment of the method according to the present invention the resource computation comprises a constrained mechanism for computing a path through said network.

In a possible embodiment of the method according to the present invention the network resources comprise atomically allocatable transport units within said network.

In a possible embodiment of the method according to the present invention the network is formed by an optical wavelength division multiplexing network.

The invention further provides a network with network resources comprising resource group function deriving means which are adapted to derive a resource group function amongst network resources of at least one network resource group of said network; and
   a path computation unit which is adapted to perform a resource-level path computation depending on the derived resource group function.

In a possible embodiment of the network according to the present invention the network further comprises a resource control unit adapted to control network resources of said at least one network resource group depending on the computation result provided by said resource-level path computation unit.

In a further possible embodiment of the network according to the present invention the network resource group is automatically generated by means of a resource auto-discovery mechanism of said network.

In an alternative embodiment of the network according to the present invention the network resource group is manually configured by an operator of said network.

In a possible embodiment of the network according to the present invention the network is formed by an optical wavelength division multiplexing WDM network comprising optical channels, transponders and regenerators as network resources.

In a further possible embodiment of the network according to the present invention the optical wavelength division multiplexing network comprises at least one reconfigurable optical add drop multiplexer as a network element.

In a further possible embodiment of the network according to the present invention the reconfigurable optical add drop multiplexer comprises a multiport-tuneable filter to which tuneable transponders are connected.

In a further possible embodiment of the network according to the present invention the multiport-tuneable filter is controlled by said resource control unit depending on a computation result on the basis of the derived resource group function of a network resource group comprising said multiport-tuneable filter.

In a further possible embodiment of the network according to the present invention the multiport-tuneable filter of said reconfigurable optical add drop multiplexer is connected to at least one wavelength selective switch connecting said reconfigurable optical add drop multiplexer with at least one optical network segment.

In a further possible embodiment of the network according to the present invention the resource group function is stored in a data storage to which said path computation unit has access.

The invention further provides a program adapted to perform a method of dynamic resource-level computation with a resource grouping constraint in a network comprising the steps of:
  deriving a resource group function from relationships amongst network resources within at least one network element forming at least one network resource group and
  performing the resource-level computation accounting for the derived resource group function.

In a further possible embodiment of the program according to the present invention the program comprises at least one traffic engineering application program.

In a further possible embodiment of the program according to the present invention the traffic engineering application program is a resource-level path computation application program.

BRIEF DESCRIPTION OF THE FIGURES

In the following possible embodiments of a method for complementing dynamic resource-level path computation with a resource grouping constraint in a network are described with reference to the enclosed figures.

DETAILED DESCRIPTION OF EMBODIMENTS

Figure 1:
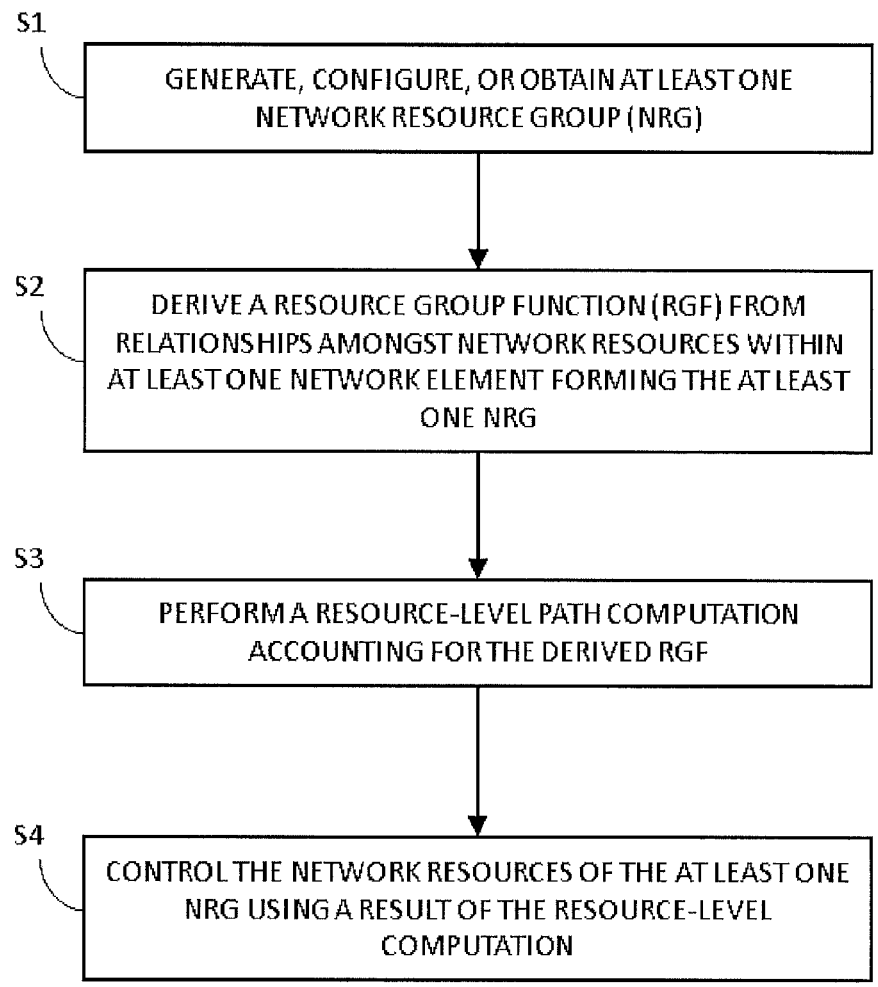
FIG. 1 shows a flow chart of a possible embodiment of a method for complementing dynamic resource-level path computation with a resource grouping constraint in a network according to the present invention.

FIG. 1 shows a flow chart of a possible embodiment of a method for complementing dynamic resource-level path computation with a resource grouping constraint in a network according to the present invention. A network such as an optical wavelength division multiplexing, WDM, network comprises network elements that are connected to each other via links, for example WDM links. Such a link can represent a pool of provisionable resources. For example, in a wavelength division layer network these provisionable resources can comprise fixed or tunable wavelength channels available for a WDM layer connection.

As can be seen in FIG. 1 a network resource group NRG can be generated automatically in step S1 by means of a resource auto-discovery mechanism of the network. In an alternative embodiment the network resource group is manually configured in step S1 by an operator of the network. In a still further embodiment the network resource group NRG can be stored in a database or a data storage and be read from this database. The network resource group NRG comprises network resources which are accessible on a network element of the network from the same or separate links. The network resources of the network resource group NRG can share in a possible embodiment a common set of attributes, functionalities and/or relationships. There can be relationships between resources where attributes of a resource or operations on a resource will have an effect on other resources of the network. These relationships can be induced via hardware or device limitations or non-orthogonalities of the resources. The network resource group NRG forms a collection of resources which are accessible on a network element from the same or separate links which share a particular common set of attributes, functionalities and/or inter-relationships. The network resource group NRG can be automatically created via the resource auto-discovery mechanism or and manually configured by a network operator. Further, the network resource group NRG can be entered into an information model manually or automatically, for example by means of dynamic routing protocols. These network resource groups NRG are uniquely identifiable within a network element of the network and can be used either implicitly by an application performing computations or may be explicitly specified by an operator as a constraint during service path computation.

In a further step S2 the resource group function RGF is derived from relationships amongst network resources within at least one network element forming at least one network resource group NRG. Deriving the resource group function from the relationships amongst the network resources within the at least one network element of the network step S2 is performed automatically.

In a further step S3 the resource-level path computation is performed accounting for the derived resource group function RGF. The resource-level path computation can comprise a constraint mechanism computing a path through the network. The path computation algorithm is aware of the relationships between the resources in order to compute feasible paths within the network.

In a further possible embodiment of the method according to the present invention after having calculated the resource-level path in response to the resource group function RGF a resource control unit of the network or network element controls the network resources of the at least one network resource group NRG in step S4 on the basis of the resource-level path computation result and depending on predetermined traffic engineering goals.

Figure 2:
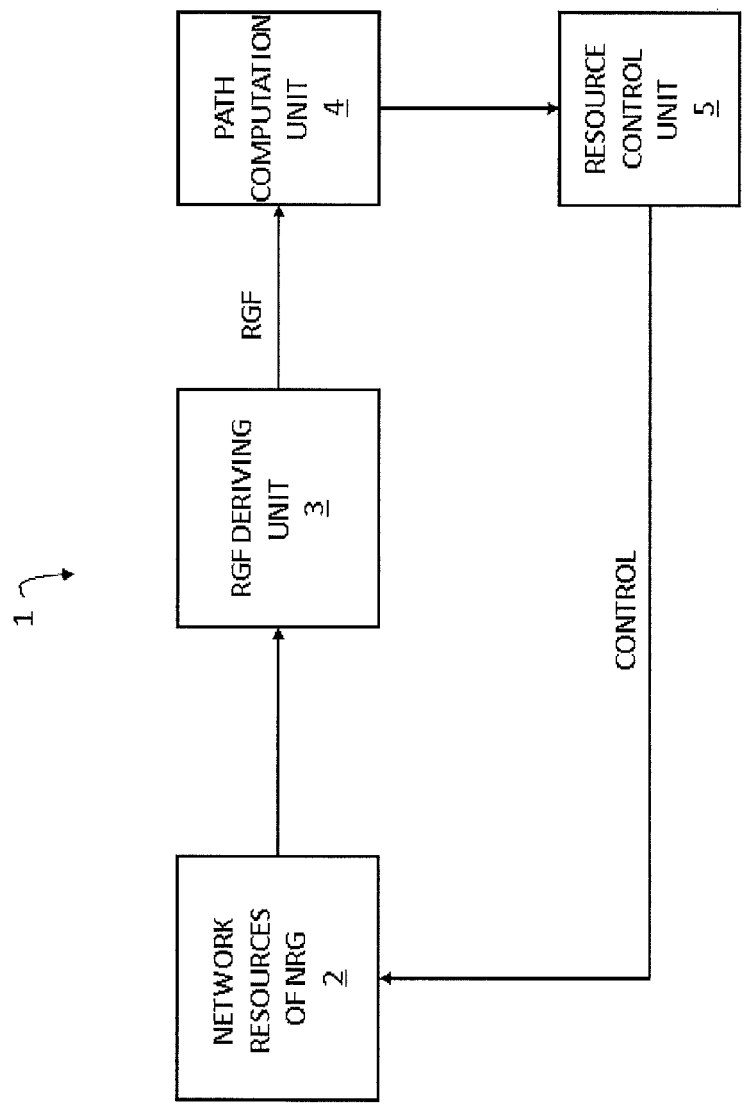
FIG. 2 shows a block diagram for illustrating a possible embodiment of a network according to the present invention.

FIG. 2 shows a diagram for illustrating a possible embodiment of a network 1 according to the present invention.

As illustrated in FIG. 2 the network 1 comprises network resources 2 of a network resource group NRG. The network resources 2 of the network resource group NRG can be accessible on a network element of the network 1 through the same or separate links. The network resources of the network resource group NRG can share a common set of attributes for functionalities and/or inter-relationships.

As can be seen in FIG. 2 the network 1 further comprises a resource group function deriving unit 3 which is adapted to derive a resource group function RGF amongst network resources of at least one network resource group NRG of the network 1. The generated resource group function RGF can be stored in a possible implementation in a data storage to which a path computation unit 4 has access. The path computation unit 4 is adapted to perform a resource-level path computation depending on the derived resource group function RGF.

In a further possible embodiment the network 1 further comprises a resource control unit 5 adapted to control network resources of the at least one network resource group NRG depending on the computation result provided by the resource-level path computation unit 4. In a possible embodiment the network 1 shown in FIG. 2 is an optical wavelength division multiplexing WDM network comprising network resources which have atomically allocatable transport units. The wavelength division multiplexing network can comprise optical channels, transponders and regenerators as network resources. The optical wavelength division multiplexing, WDM, network 1 can further comprise at least one reconfigurable optical add drop multiplexer ROADM as a network element. In a specific embodiment the reconfigurable optical add drop multiplexer ROADM can comprise at least one multi-port tunable filter to which tunable transponders are connected as shown in the example illustrated in FIG. 3.

Figure 3:
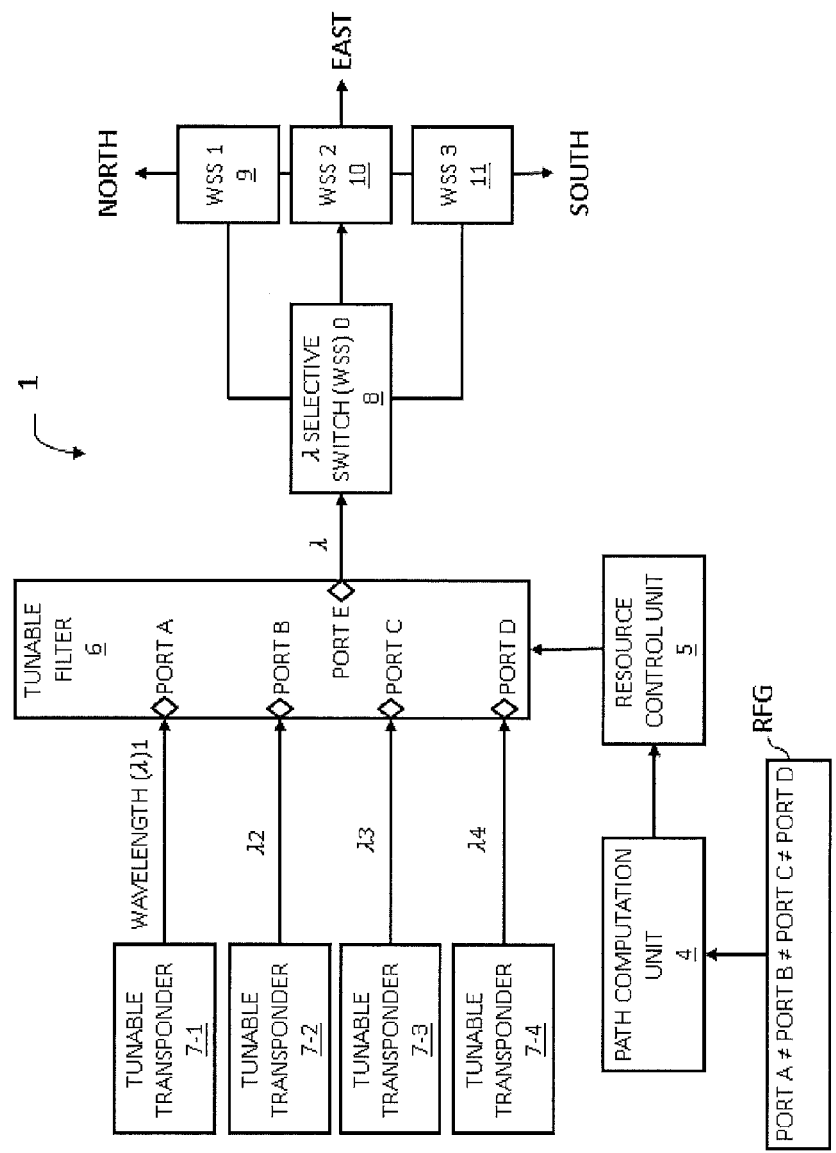
FIG. 3 shows an example of network elements comprising network resources for which a method for complementing dynamic resource-level computation can be performed.

FIG. 3 shows a block diagram of a network element which can be used in an optical layer network. In the shown example the network element is a reconfigurable optical add drop multiplexer comprising a multi-port tunable filter 6 to which tunable transponders 7-1, 7-2, 7-3, 7-4 are connected. The tunable transponders 7-i transmit an optical signal with a wavelength $\lambda$ via a transmission line to a corresponding input port a, b, c, d of the multi-port tunable filter 6. The multi-port tunable filter 6 further comprises an output port e connected to a wavelength selective switch 8 having in the shown implementation three outputs N (North), E (East), S (South). Each output of the wavelength selective switch 8 is connected to a further wavelength selective switch 9, 10, 11. The first wavelength selective switch 9 is connected to a North (N) network segment. The second wavelength selective switch 10 is connected to an East (E) network segment. The third wavelength selective switch 11 is connected to a South (S) network segment in the optical wavelength division, WDM, network. The wavelength selective switches WSS 8, 9, 10, 11 reflect the physical environment of the optical network. In the shown exemplary embodiment different transponders 7-i output a signal with a specific wavelength $\lambda$ put together by the multi-port tunable filter 6 of the network resource group NRG having a constraint so that the wavelength selection can be performed in such a way that there is no spectrum overlap of the different tunable transponders 7-i. The network resource group NRG comprises the tunable transponders 7-i as well as the multi-port tunable filter 6 can in a possible embodiment be automatically generated by means of a resource auto-discovery mechanism. Alternatively, the network resource group NRG can also be manually configured by an operator of the network. The network resources of the network resource group NRG are accessible on the network element from the same or separate links as shown in FIG. 3.

The resource group function deriving unit 3 as shown in FIG. 2 of the network can derive a resource group function RGF from the relationships amongst the network resources. In the given example the resource group function deriving unit 3 provides the following resource group function RGF: $a \neq b \neq c \neq d$, indicating that the input ports forming resources of the network resource group NRG require exclusivity to avoid spectrum overlap between the channels. The resource group function RGF is caused here by a physical constraint. The group function RGF as shown in FIG. 3 can be stored in a data storage used by the path computation unit 4 which performs a resource-level path computation depending on the resource group function RGF. The resource control unit 5 connected to the multi-port tunable filter 6 is adapted to control the resources of the respective network resource group NRG depending on the computation result provided by the resource-level path computation unit 4. In the given exemplary embodiment the resource control unit 5 controls the multi-port tunable filter 6 according to the resource group function RGF of the resource group to which the multi-port tunable filter 6 belongs. The network resources of the network resource group NRG are controlled depending on predetermined traffic engineering goals for the network. The resource group function RGF can also be derived depending on configuration requirements. For example, such a requirement might be for example that a specific wavelength $\lambda$ is switched by the wavelength selective switches 8, 9, 10, 11 to the North network segment N whereas signals having another wavelength $\lambda$ are forwarded to the other two network segments East E and South S. In this example, the different wavelength selective switches 8, 9, 10, 11 as shown in FIG. 3 form another network resource group NRG of a network element within the network. According to the desired resource allocation a corresponding resource group function RGF can be derived and used by a path computation unit 4 of the network to calculate a corresponding resource level path. The generation of network resource groups NRG through a resource auto-discovery mechanism can be performed in regular time intervals or in response to a reconfiguration of the network. The resource group function RGF can be changed dynamically upon reconfiguration of the network or can be event driven. In a possible implementation the resource-level path computation is performed automatically if the corresponding resource group function RGF is changed.

The relationships between resources can be induced via hardware or device limitations or non-orthogonalities. Other relationships can be induced directly through application or specific operational policies for the given network 1. For example, a network element containing a multi-port tunable filter 6 as shown in FIG. 3 comprises an exclusion relationship between the wavelength channels used by the tunable transponders 7 attached to the multi-port tunable filter 6. For example, only one attached transponder can be tuned to a given wavelength $\lambda$ at any given time.

As another example, resource relationships may also be created in order to express a particular capability such as providing protection or restoration functionality. Applications to the given resource as a primary source to protect a service may then introduce a relationship with other resources to become either selectable or excluded from use for the secondary resource.

Further, it is possible that resources of the network are explicitly grouped through manual configuration to indicate relationships between resources based on an administrative policy for the network. For example, individual resources of the network may be identified in a network resource group as being available for provisioning prior to actual insertion of the underlying facilities.

In order for applications to be able to process the resource relationships these relationships can be exposed to other applications. For example, a past computation algorithm can be aware of the relationships between network resources in order to properly compute feasible paths. In a possible embodiment the method according to the present invention provides an abstract grouping concept to an information model which allows normally hidden resource relationships to be expressed to applications which can then perform computationally complete operations on the respective information model. In a preferred embodiment network resource groups NRG are uniquely identifiable within a network element of the network and can be used either implicitly by an application performing computation or may be explicitly specified by an operator of the network as a constraint during service path computation. The method for complementing dynamic resource-level path computation with a resource grouping constraint in a network 1 can be performed by a program, for example, by a traffic engineering application program. This traffic engineering application program can be a resource-level path computation application program. The execution of such a program can be triggered in response to a command of a network operator or can be event driven, for example, when a configuration of the network 1 is changed or when an additional constraint occurs. Such a program can for example be executed by a control unit of the network 1. In a further embodiment the derived resource group function RGF of a network resource group NRG can be displayed to an operator of the network. In a further possible implementation the network operator can edit the resource group function RGF. In a further possible implementation the constraint expressed by the resource group function RGF can distinguish between physical constraints which cannot be influenced by the operator and configuration constraints which can be varied by the network operator. A resource group function RGF based on configuration requirements may be changed by the network operator according to traffic engineering goals. In contrast, if the resource group function RGF is based on physical requirements the derived resource group function RGF cannot be changed by the network operator. Consequently, the resource group function RGF can in a possible implementation be adjustable whereas the resource group function RGF can in another implementation be predetermined and fixed. In a possible embodiment the resource group function RGF is derived during operation of the network. The resource-level path computation can in a possible embodiment be performed during operation of the network taking into account the derived resource group function RGF. In a further possible embodiment the resource group function RGF is derived for planning the network before the operation of the network is started. In a further possible embodiment the deriving of the resource group function RGF from relationships amongst network resources of at least one network element forming at least one network resource group NRG can be performed in real time, for example when an event in the network is detected, e.g. a network failure of a network element or the like. In a further possible embodiment an error can be indicated to an operator if the configuration of network elements or network resources violate a given resource group function RGF.

The subject matter described herein can be implemented using a non-transitory computer-readable medium having stored thereon executable instructions that when executed by the processor of a computer control the computer to perform steps. For example, the various units described herein can be implemented in software stored in memory and executed by a microprocessor. Exemplary computer-readable media suitable for implementing the subject matter described herein include chip memory devices, disk memory devices, programmable logic devices, and application-specific integrated circuits. In addition, a computer-readable medium that implements the subject matter described herein may be located on a single device or computing platform or may be distributed across multiple devices or computing platforms.

The invention claimed is:

1. A method for complementing dynamic resource-level path computation with a resource grouping constraint in an optical wavelength division multiplexing (WDM) network, comprising the steps of:
  deriving, using a resource group function (RGF) deriving unit comprising a processor and memory, a resource group function (RGF) from inter-relationships amongst network resources within at least one network element forming at least one network resource group (NRG); and
  performing, using a path computation unit, the resource-level path computation accounting for the derived resource group function (RGF);
  said optical WDM network comprising network resources having atomically allocatable transport units;
  said optical WDM network comprising optical channels, transponders and regenerators as network resources;
  wherein the network resources of the network resource group (NRG) share a common set of at least one of attributes, functionalities and inter-relationships,
  wherein inter-relationships are induced via either one of device limitations and non-orthogonalities of the network resources,
  wherein said device limitations and said non-orthogonalities of the network resources are induced directly through an application,
  wherein said optical WDM network comprises at least one reconfigurable optical add drop multiplexer (ROADM) as the at least one network element, said ROADM comprising a multiport-tunable filter to which tunable transponders are connected, and
  wherein the multi-port tunable filter comprises an exclusion relationship between the wavelength channels.

2. The method according to claim 1, wherein the network resources of said network resource group (NRG) are controlled depending on predetermined traffic engineering goals.

3. The method according to claim 1, wherein the network resource group (NRG) is automatically generated by means of a resource auto-discovery mechanism or manually configured by an operator of said network.

4. The method according to claim 1, wherein the network resource group (NRG) comprises network resources which are accessible on the at least one network element of said optical WDM network from the same or separate links.

5. The method according to claim 1, wherein said resource-level path computation comprises a constraint mechanism for computing a path through said optical WDM network.

6. The method of claim 1, wherein said device limitations and said non-orthogonalities of the network resources are further induced through specific operational policies for the network.

7. A network with network resources, comprising:
  resource group function deriving means which are adapted to derive a resource group function (RGF) amongst network resources of at least one network resource group (NRG) of said network; and
  a path computation unit which is adapted to perform a resource-level path computation depending on the derived resource group function (RGF),
  wherein said network is an optical wavelength division multiplexing (WDM) network;
  said optical WDM network comprising network resources having atomically allocatable transport units;
  said optical WDM network comprising optical channels, transponders and regenerators as network resources;

wherein the network resources of the network resource group (NRG) share a common set of at least one of attributes, functionalities and inter-relationships, wherein inter-relationships are induced via either one of device limitations and non-orthogonalities of the network resources, wherein said device limitations and said non-orthogonalities of the network resources are induced directly through an application, wherein said optical WDM network comprises at least one reconfigurable optical add drop multiplexer (ROADM) as a network element, said ROADM comprising a multiport-tunable filter to which tunable transponders are connected, and wherein the multi-port tunable filter comprises an exclusion relationship between the wavelength channels.

8. The network according to claim 7, further comprising a resource control unit adapted to control network resources of said at least one network resource group (NRG) depending on the computation result provided by said path computation unit.

9. The network according to claim 7, wherein the network resource group (NRG) is automatically generated by means of a resource auto-discovery mechanism of said network or manually configured by an operator of said network.

10. The network according to claim 8, wherein said multiport-tunable filter is controlled by said resource control unit depending on a computation result on the basis of the derived resource group function (RGF) of the network resource group (NRG) comprising said multiport-tunable filter.

11. The network according to claim 10, wherein said multiport-tunable filter of said reconfigurable optical add drop multiplexer (ROADM) is connected to at least one wavelength selective switch connecting said reconfigurable optical add drop multiplexer (ROADM) with at least one optical network segment of said network.

12. The network according to claim 7, wherein said resource group function (RGF) is stored in a data storage to which said path computation unit has access.

13. The network of claim 7, wherein said device limitations and said non-orthogonalities of the network resources are further induced through specific operational policies for the network.

14. A computer program product, comprising:
a non-transitory computer readable medium having control logic stored therein for causing a computer to complement a dynamic resource-level path computation with a resource grouping constraint in a network,
wherein the control logic when executed by a processor of the computer controls the computer to perform steps comprising:
deriving a resource group function (RGF) from inter-relationships amongst network resources within at least one network element forming at least one network resource group (NRG), and
performing the resource-level path computation accounting for the derived resource group function (RGF),
wherein said network is an optical wavelength division multiplexing (WDM) network;
said optical WDM network comprising network resources having atomically allocatable transport units, and
said optical WDM network comprising optical channels, transponders and regenerators as network resources;
wherein the network resources of the network resource group (NRG) share a common set of at least one of attributes, functionalities and inter-relationships,
wherein inter-relationships are induced via either one of device limitations and non-orthogonalities of the network resources,
wherein said device limitations and said non-orthogonalities of the network resources are induced directly through an application,
wherein said optical WDM network comprises at least one reconfigurable optical add drop multiplexer (ROADM) as the at least one network element, said ROADM comprising a multiport-tunable filter to which tunable transponders are connected, and
wherein the multi-port tunable filter comprises an exclusion relationship between the wavelength channels.

15. The computer program product according to claim 14, wherein the program comprises at least one traffic engineering application program.

16. The computer program product according to claim 15, wherein the traffic engineering application program is a resource-level path computation application program.

17. The computer program of claim 14, wherein said device limitations and said non-orthogonalities of the network resources are further induced through specific operational policies for the network.

\* \* \* \* \*